(12) United States Patent
Chen et al.

(10) Patent No.: US 8,422,367 B2
(45) Date of Patent: Apr. 16, 2013

(54) METHOD OF ESTIMATING CONGESTION

(75) Inventors: Mingyu Chen, Stockholm (SE);
Christoffer Rodbro, Stockholm (SE);
Soren Vang Andersen, Luxembourg (LU)

(73) Assignee: Skype, Dublin (IE)

( * ) Notice: Subject to any disclaimer, the term of this patent is extended or adjusted under 35 U.S.C. 154(b) by 366 days.

(21) Appl. No.: 12/824,560

(22) Filed: Jun. 28, 2010

(65) Prior Publication Data

US 2011/0205895 A1 Aug. 25, 2011

(30) Foreign Application Priority Data

Feb. 25, 2010 (GB) .................................. 1003206.8

(51) Int. Cl.
*H04J 1/16* (2006.01)
(52) U.S. Cl.
USPC .......................................... 370/229; 370/235
(58) Field of Classification Search .................. 370/229, 370/231, 232, 235.1, 235, 252, 389
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,560,198 B1 * | 5/2003 | Ott et al. | 370/235 |
| 6,894,974 B1 | 5/2005 | Aweva et al. | |
| 7,526,000 B2 * | 4/2009 | Van Gestel | 370/516 |
| 7,724,660 B2 * | 5/2010 | Segel | 370/230.1 |
| 7,859,996 B2 * | 12/2010 | Kwan et al. | 370/229 |
| 7,983,156 B1 * | 7/2011 | Papirakis | 370/229 |
| 2008/0232521 A1 | 9/2008 | Rodbro et al. | |
| 2008/0239953 A1 | 10/2008 | Bai et al. | |

FOREIGN PATENT DOCUMENTS

| | | |
|---|---|---|
| EP | 1 552 633 A2 | 7/2005 |
| EP | 1 704 685 A1 | 9/2006 |
| EP | 2 005 671 A2 | 12/2008 |
| WO | WO 2004/030433 A2 | 4/2004 |
| WO | WO 2005/064861 A1 | 7/2005 |
| WO | WO 2007/120710 A2 | 10/2007 |

OTHER PUBLICATIONS

Notification of Transmittal of the International Search Report and the Written Opinion of the International Searching Authority, or the Declaration, PCT/EP2011/052850, mailed Apr. 29, 2011, pp. 14.

(Continued)

*Primary Examiner* — Brenda H Pham
(74) *Attorney, Agent, or Firm* — Wolfe-SBMC

(57) ABSTRACT

Provided is a method of controlling traffic transmitted over a network path from a transmitter to a receiver via a router, the traffic comprising a plurality of packets, and the method comprising: at one of said transmitter and receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and based on said estimates of current queue length and maximum queue length, controlling traffic between the transmitter and receiver over said network path.

38 Claims, 4 Drawing Sheets

OTHER PUBLICATIONS

Kuzmanovic, A., et al., "TCP-LP: Low Priority Service via End-Point Congestion Control," IEEE/ACM Transactions on Networking, 14:739-752 (Aug. 1, 2006).

Weigle, M., et al., "Delay-based early congestion detection and adaptation in TCP: impact on web performance," Computer Communications 28:837-850 (May 16, 2005).

Kotla, K., et al., "Making a Delay-Based Protocol Adaptive to Heterogeneous Environments," Quality of Service, 2008. IWQOS 2008. 16th International Workshop, pp. 100-109 (Jun. 2, 2008).

Jammch, E., et al., "Delay-Based Congestion Avoidance for Video Communication with Fuzzy Logic Control," ESE Department, University of Essex, U.K., Packet Video, pp. 8-17, (Nov. 1, 2007).

Spring, N., et al., "Receiver Based Management of Low Bandwidth Access Links," Proc. of the IEEE INFOCOM 2000 Conference on Computer Communications, pp. 245-254 (Mar. 26, 2000).

Combined Search and Examination Report under Sections 17 and 18(3) for Application No. GB1003206.8; Date Mailed: Jun. 14, 2010 (8 pages).

* cited by examiner

METHOD OF ESTIMATING CONGESTION

RELATED APPLICATION

This application claims priority under 35 U.S.C. §119 or 365 to Great Britain Application No. 1003206.8, filed Feb. 25, 2010. The entire teachings of the above application are incorporated herein by reference.

TECHNICAL FIELD

The present invention relates to a method of estimating congestion, to a method of processing data at an end-point of a connection, to an apparatus adapted to perform one or both of these methods, and to a computer program product comprising program code adapted to perform steps of one or both of these methods when run on a processor.

BACKGROUND

In a communication system, a communication network is provided, which can link together two end-point apparatuses or devices so that the end-point devices can send information to each other in a call or other communication event. The information may comprise speech, text, images or video and one or both of the devices may comprise a user terminal such as a personal computer or mobile phone.

Communication systems operable over the internet include voice over internet protocol ("VoIP") systems, which comprise the routing of voice in conversations over the internet or through any other IP-based communication network. Such systems are beneficial for the user as they are often of significantly lower cost than conventional fixed line or mobile telecommunication networks. This may particularly be the case for long-distance communication. To use a VoIP system, a user installs and executes client software of their device (i.e. user terminal). The client software sets up the VoIP connections as well as providing other functions, such as registration and authentication. In addition to voice communication, the client may also set up connections for other communication media such as video calling, instant messaging (IM), SMS messaging, file transfer and voicemail.

One type of communication system for packet-based communication uses a peer-to-peer ("P2P") topology. To enable access to a peer-to-peer system, a user must execute P2P client software provided by a P2P software provider on their device, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on end users' devices within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or "user identity certificates", "UIC") between users provides proof of the users' identities and that they are suitably authorized and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital certificates, without using a server for those purposes. Further details of an example P2P system can be found in WO 2005/009019. VoIP or other packet-based communications can also be implemented using non-P2P systems that do use centralized call set-up and/or authentication, e.g. via a server or mobile telecommunications network.

Modern communication systems are based on the transmission of digital signals between end-points, such as user terminals, across a packet-based communication network, such as the internet. Analogue information such as speech may be input into an analogue-to-digital converter at a transmitter of one terminal and converted into a digital signal. The digital signal is then encoded and placed in data packets for transmission over a channel via the packet-based network to the receiver of another terminal.

Such packet-based communication systems are subject to factors which may adversely affect the quality of a call or other communication event between two end-points. As the growth of the internet increases and users demand new applications and better performance, the rise in data volume generates problems such as long delays in delivery of packets, lost and dropped packets, oscillations and synchronization problems. These troubles are due to congestion, which happens when there are too many sources sending too much data too fast for the network to handle.

Data packets sent from a sending end-point typically pass through one or more routers in the internet before arriving at a receiving end-point. An internet router typically maintains a set of queues, with one queue per interface that holds packets scheduled to go out on that interface. These queues often use a drop-tail discipline, in which a packet is put into the queue if the queue is shorter than its maximum size. When the queue is filled to its maximum capacity, newly arriving packets are dropped until the queue has enough room to accept incoming traffic. Drop-tail queues have a tendency to penalize bursty flows, and to cause global synchronization between flows. Each packet is treated in the same way by a drop-tail queue. Often packets from multiple connections are dropped, causing all involved senders in the connections to enter a "slow-start" state, in which all the senders reduce their data sending rate for a certain period of time. Often all the senders use the same time delay before increasing their sending rates again. Thus, when these delays expire at the same time, all of the senders begin to send additional packets, and the routers queues again overflow causing more packets to be dropped. As a result, the senders again reduce their data sending rate for the fixed delay period. This is an inefficient use of bandwidth, since available bandwidth is often not used and, due to the large number of dropped packets, available bandwidth is used in re-transmission of missing packets.

The performance of network congestion control can be improved if the routers in the internet run Active Queue Management (AQM) and feed back information to end-points of connections using Explicit Congestion Notification (ECN) markings AQM is a technique that consists of dropping or ECN-marking a packet before the queue for which it is bound is full. Typically, these routers operate by maintaining one or more probabilities, and probabilistically dropping or marking packets even when a queue is short. When ECN is used, a router is able to set a flag in a header of a packet, instead of dropping the packet, in order to signal to a downstream receiver the level of congestion. The flag comprises two bits in the header. The receiver echoes the congestion indication to the sender of the packet, which then reacts as though a packet drop was detected. By dropping packets probabilistically, AQM disciplines typically avoid penalizing bursty flows. Also, by providing the end-points (e.g. user terminals) of a connection with congestion indications before a queue is full, AQM disciplines are typically able to maintain a shorter queue length than drop-tail disciplines, which reduces network latency ("ping time"). Early detection and notification of impending congestion helps to avoid global synchronization.

Internet congestion control is carried out in the transport layer at the sources (end-points) and has two parts: the end-to-end protocol TCP (transmission control protocol), and the AQM scheme implemented in routers. The most common AQM objectives are: efficient queue utilization (i.e. to minimize the occurrences of queue overflow and underflow, thus reducing packet loss and maximizing link utilization), small queuing delay (i.e. to minimize the time required for a data packet to be serviced by the routing queue) and robustness (i.e. to maintain closed-loop performance in spite of changing conditions).

Different algorithms for AQM schemes have been proposed, such as RED (Random Early Detection) and its variants, PI, REM, Blue, AVQ, etc. RED monitors an average queue size at a router and drops (or marks, when used in conjunction with ECN) packets based on statistical probabilities. If the queue is empty or almost empty, all incoming packets are accepted. As the queue length grows, the probability for marking or dropping incoming packets grows too. When the buffer is full, the incoming packets are dropped. As the proportion of marked packets increases, a rate controller at the source of the packets (i.e. an end-point of the connection that passes through the router) reactively reduces the sending rate of packets.

SUMMARY

"Normalized Queueing Delay: Congestion Control Jointly Utilizing Delay and Marking" by Mingyu Chen et al., published in IEEE/ACM TRANSACTION ON NETWORKING, Vol 17, No:2, April 2009, discusses delay and marking (D+M) TCP that can be utilized at an end-point of a connection to control its data transmission rate.

AQM is implemented at routers where the actual queue can easily be monitored. However, currently only a small proportion of routers implements AQM and support ECN. Most routers use the drop-tail principle instead. Thus, it is far from guaranteed that all routers involved in the transmission of packets carrying information relating to a user's call or other communication event between two end-points will support AQM and ECN. As such, packets carrying data for the user's call or other communication event are likely to be dropped by a drop-tail queue at a router, instead of being marked using ECN and progressed towards the intended receiver using AQM. Thus, the quality of the call or other communication event is likely to be adversely affected.

Poor quality of a call or other communication event can be frustrating for a user, and can cause him or her to seek alternative communication methods. It is an aim of some embodiments of the present invention to address one or more of these problems.

The present invention therefore provides one or more systems and methods for implementation to attempt to enhance the performance of network congestion control.

Accordingly, a first aspect of the present invention provides a method of controlling traffic transmitted over a network path from a transmitter to a receiver via a router, the traffic comprising a plurality of packets, and the method comprising: at one of said transmitter and receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and based on said estimates of current queue length and maximum queue length, controlling traffic between the transmitter and receiver over said network path.

A second aspect of the present invention provides a method of controlling traffic transmitted over a network path between a transmitter and a receiver via a router, the traffic comprising a plurality of packets, and the method comprising: at one of said transmitter and receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and based on said estimates of current queue length and maximum queue length, sending feedback from said one of said transmitter and receiver to the other of said transmitter and receiver, which feedback is for causing said other of said transmitter and receiver to control traffic over the network path.

A third aspect of the present invention provides a method of setting an indicator in a packet transmitted over a network path from a transmitter to a receiver via a router, wherein the indicator is set to provide an indication of network congestion such that the rate of transmission of the plurality of packets from the transmitter to the receiver may be controlled, the method comprising: at one of said transmitter and receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and setting the indicator in the packet at one of said transmitter and receiver, based on said estimates of current queue length and maximum queue length.

A fourth aspect of the present invention provides a computer program product comprising code arranged so as when executed on a processor to perform the steps of the first aspect.

A fifth aspect of the present invention provides a computer program product comprising code arranged so as when executed on a processor to perform the steps of the second aspect.

A sixth aspect of the present invention provides a computer program product comprising code arranged so as when executed on a processor to perform the steps of the third aspect.

A seventh aspect of the present invention provides a transmitter comprising: an estimator configured to estimate a maximum queue length at a buffer of a router on a network path between the transmitter and a receiver based on a maximum observed delay for traffic to travel from the transmitter to the receiver; an estimator configured to estimate a current queue length at the buffer of the router based on an observed delay for one or more specified packets to travel from the transmitter to the receiver; and a controller configured to control traffic between the transmitter and receiver over said network path, based on said estimates of current queue length and maximum queue length.

An eighth aspect of the present invention provides a receiver comprising: an estimator configured to estimate a maximum queue length at a buffer of a router on a network path between a transmitter and the receiver based on a maximum observed delay for traffic to travel from the transmitter to the receiver; an estimator configured to estimate a current queue length at the buffer of the router based on an observed delay for one or more specified packets to travel from the transmitter to the receiver; and a controller configured to control traffic between the transmitter and receiver over said network path, based on said estimates of current queue length and maximum queue length.

A ninth aspect of the present invention provides a transmitter comprising: an estimator configured to estimate a maximum queue length at a buffer of a router on a network path between the transmitter and a receiver based on a maximum observed delay for traffic to travel from the transmitter to the receiver; an estimator configured to estimate a current queue length at the buffer of the router based on an observed delay for one or more specified packets to travel from the transmitter to the receiver; and a sender configured to send feedback to said receiver, based on said estimates of current queue length and maximum queue length, which feedback is for causing said receiver to control traffic over the network path.

A tenth aspect of the present invention provides a receiver comprising: an estimator configured to estimate a maximum queue length at a buffer of a router on a network path between a transmitter and the receiver based on a maximum observed delay for traffic to travel from the transmitter to the receiver; an estimator configured to estimate a current queue length at the buffer of the router based on an observed delay for one or more specified packets to travel from the transmitter to the receiver; and a sender configured to send feedback to said transmitter, based on said estimates of current queue length and maximum queue length, which feedback is for causing said transmitter to control traffic over the network path.

An eleventh aspect of the present invention provides a transmitter comprising: an estimator configured to estimate a maximum queue length at a buffer of a router on a network path between the transmitter and a receiver based on a maximum observed delay for traffic to travel from the transmitter to the receiver; an estimator configured to estimate a current queue length at the buffer of the router based on an observed delay for one or more specified packets to travel from the transmitter to the receiver; and a setter configured to set an indicator in a packet transmitted over the network path from the transmitter to the receiver via the router, based on said estimates of current queue length and maximum queue length, wherein the indicator is set to provide an indication of network congestion such that the rate of transmission of the plurality of packets from the transmitter to the receiver may be controlled.

A twelfth aspect of the present invention provides a receiver comprising: an estimator configured to estimate a maximum queue length at a buffer of a router on a network path between a transmitter and the receiver based on a maximum observed delay for traffic to travel from the transmitter to the receiver; an estimator configured to estimate a current queue length at the buffer of the router based on an observed delay for one or more specified packets to travel from the transmitter to the receiver; and a setter configured to set an indicator in a packet transmitted over the network path from the transmitter to the receiver via the router, based on said estimates of current queue length and maximum queue length, wherein the indicator is set to provide an indication of network congestion such that the rate of transmission of the plurality of packets from the transmitter to the receiver may be controlled.

BRIEF DESCRIPTION OF THE DRAWINGS

For a better understanding of the present invention, and to show how the same may be carried into effect, example embodiments of the present invention will now be described with reference to the drawings, in which.

DETAILED DESCRIPTION

As discussed above, currently only few internet routers support AQM and ECN. In order to enhance the performance of network congestion control, it is proposed in some embodiments of the present invention to run a virtual version of AQM at one or more end-points of a connection. It has been found by experimentation that this virtual AQM provides a good approximation to the case of running AQM at routers. In some embodiments, the virtual AQM running at an end-point provides a probability which is used in order to determine whether to ECN-mark a packet received at the end-point and/or to ECN-mark a packet to be transmitted from the end-point and/or to take other step(s) at the end-point to control the rate of transmission of packets. Congestion control protocols, such as TCP, would be able to use the flags provided by the end-point to enhance the overall performance of a network.

In order to try to control or reduce congestion in a network, some embodiments of the present invention provide a method for controlling a rate of transmission of packets on a connection from a first end-point of the connection on towards a second end-point of the connection. In addition to helping to control or reduce congestion, some embodiments of the present invention provide an indication of congestion from the second end-point to the first end-point, and attempt to reduce the number of packets which are dropped on the connection.

Examples of a suitable communication system and terminal for the implementation of embodiments of the present invention will now be described.

Figure 1:
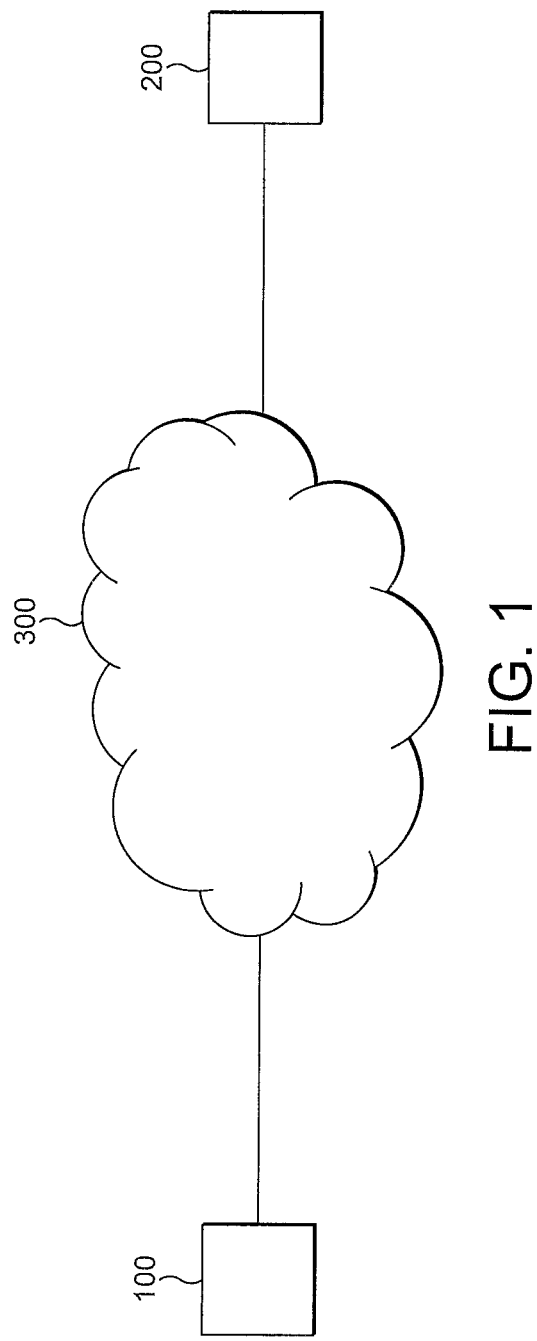
FIG. 1 shows two end-points of a connection connected to each other via a communication network.

Reference will first be made to FIG. 1, which shows a first terminal 100 connected via a communication network 300 to a second terminal 200.

Although in this embodiment the first and second terminals form the end-points of the connection via the network 300, in other embodiments one or both of the end-points could take another form e.g. a server or other node. One or both of the terminals 100 and 200 may comprise, for example, a personal computer, a gaming device, a personal digital assistant (PDA), a suitably enabled mobile phone, a television, or another device able to connect to the network 300. Initiation of the establishment of the connection between the terminals may be performed by either of the terminals. Since the establishment of the connection may be as is well known in the art, for conciseness it will not be further described herein.

The network 300 comprises a packet-based network. Although the first terminal 100 and second terminal 200 are arranged to exchange data with each other via the network 300, for the purpose of the following discussion the first terminal 100 will be referred to as the transmitting terminal and the second terminal 200 will be referred to as the receiving terminal. In some embodiments, the packets carry information (comprising one or more of speech, text, images or video) of a call or other communication event that has been established between the terminals 100, 200.

In some embodiments in the invention, the communication network 300 comprises a VoIP network provided by the internet. It should be appreciated that, even though the exemplifying embodiment shown and described in detail herein uses the terminology of a VoIP network, embodiments of the present invention can be used in any other suitable communication system that facilitates the transfer of data.

In a preferred embodiment of the invention, the VoIP system is a peer-to-peer (P2P) communication system, in which a plurality of end users can be connected for communication purposes via a communication structure such as the internet. The terminals 100, 200 illustrated in FIG. 1 may each be associated with an end user. The communication structure is substantially decentralized with regard to communication switching therein for connecting the end users. That is, the end users can establish their own communication routes through the structure based on the exchange of an authorization certificate (UIC) to acquire access to the structure. As mentioned above, such a communication system described in WO2005/009019.

In the case when the network 300 comprises the internet, then each terminal has an associated IP address usable in the internet to locate the terminal. Moreover, the data communicated between the terminals is transported in internet protocol (IP) packets. It will of course be appreciated that many more elements make up the internet than those explicitly shown. This is represented schematically in FIG. 1 by a communications cloud 300, which may include many servers and gateways, as well as routers of the internet service providers (ISPs) and internet backbone routers. Furthermore, it will of course be appreciated that many more terminals may be connected to the network 300 than the two 100, 200 shown.

Figure 2:
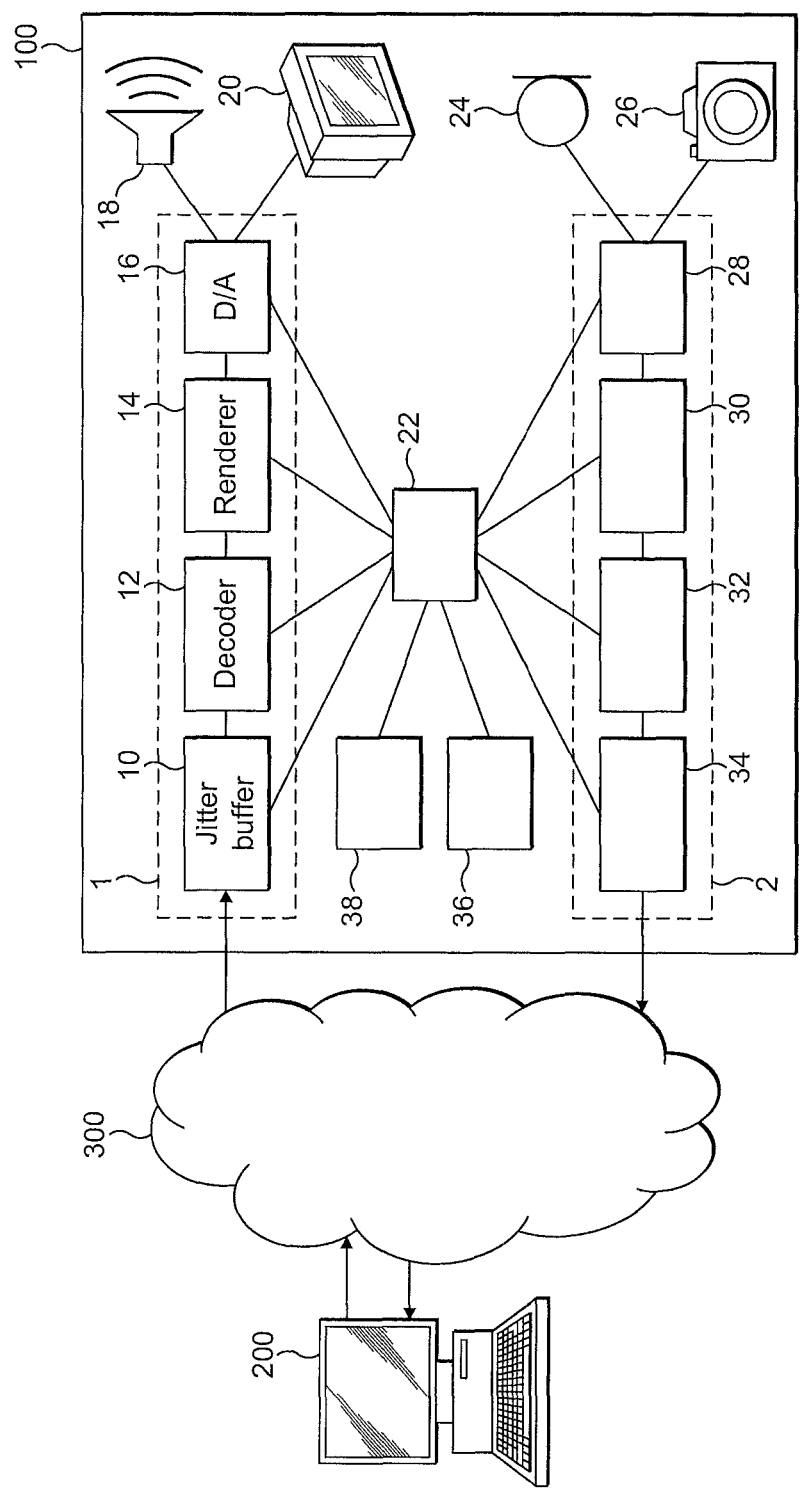
FIG. 2 shows a schematic block diagram of a user terminal suitable for the implementation of an embodiment of the present invention.

Reference will now be made to FIG. 2, which shows the first terminal 100 in more detail.

The first terminal 100 includes receiving circuitry 1 for receiving data transmitted from the second terminal 200 via the network 300, and transmitting circuitry 2 for transmitting data to the second terminal 200 via the network 300. The receiving circuitry 1 is arranged to output, to various output devices such as a loudspeaker 18 and a display screen 20, data that is received in packets contained in a signal received via the network 300 from e.g. the second terminal 200. The receiving circuitry 1 comprises a jitter buffer 10 for buffering data packets received from the network 300, a decoder 12 for decoding the data received in the data packets, a renderer 14 for handling video data to be output to the display screen 20, and a digital-to-analogue converter 16 for outputting analogue data to analogue output devices.

The transmitting circuitry 2 of the terminal 100 is arranged to receive data from input devices such as a microphone 24 and a webcam 26, and to transmit the data in a signal via the network 300 to e.g. the second terminal 200. The transmitting circuitry 2 comprises an analogue-to-digital converter 28 for converting analogue data input from an analogue input device into digital information, an encoder 30 for encoding the digital information into encoded data frames, a packetizer 32 for placing the encoded data frames into packets, and a buffer 34 arranged to queue the packets before they are transmitted into the network 300.

In accordance with an embodiment of the invention, a processor 22 of the user terminal 100 is arranged to control the operation of the components of the transmitting circuitry 2. For example, preferably the bit rate at which the encoder 30 encodes data is controlled by the processor 22, in order to control the rate at which data is transmitted from the buffer 34 into the network 300.

In this embodiment, the processor 22 comprises a central processing unit (CPU). It will be noted that, in some embodiments, further connections will be provided between the components of the terminal 100, such as connections between the processor 22 and each of the input and output devices.

Also, while the microphone 24, webcam 26, loudspeaker 18, and display screen 20 are shown as integral with the first terminal 100, in other embodiments one or more of these may take the form of a peripheral device connected to the user terminal 100 via a wired or wireless connection. Furthermore, in embodiments where the end-point 100 comprises an apparatus other than a user terminal, one or more of the microphone 24, webcam 26, loudspeaker 18, and display screen 20 may be omitted.

A non-volatile memory 36, such as a hard-drive or flash memory, and a volatile memory 38, such as a random access memory (RAM), are also coupled to the CPU 22. The non-volatile memory 36 stores software including at least an operating system (OS), and packet-based communication software in the form of a P2P communication client. On start-up or reset of the terminal 100, the operating system is automatically loaded into the RAM 38 and from there it is run by being executed on the CPU 22. Once running, the operating system can then run applications such as the P2P communications client by loading them into the RAM 38 and executing them on the CPU 22.

Figure 3:
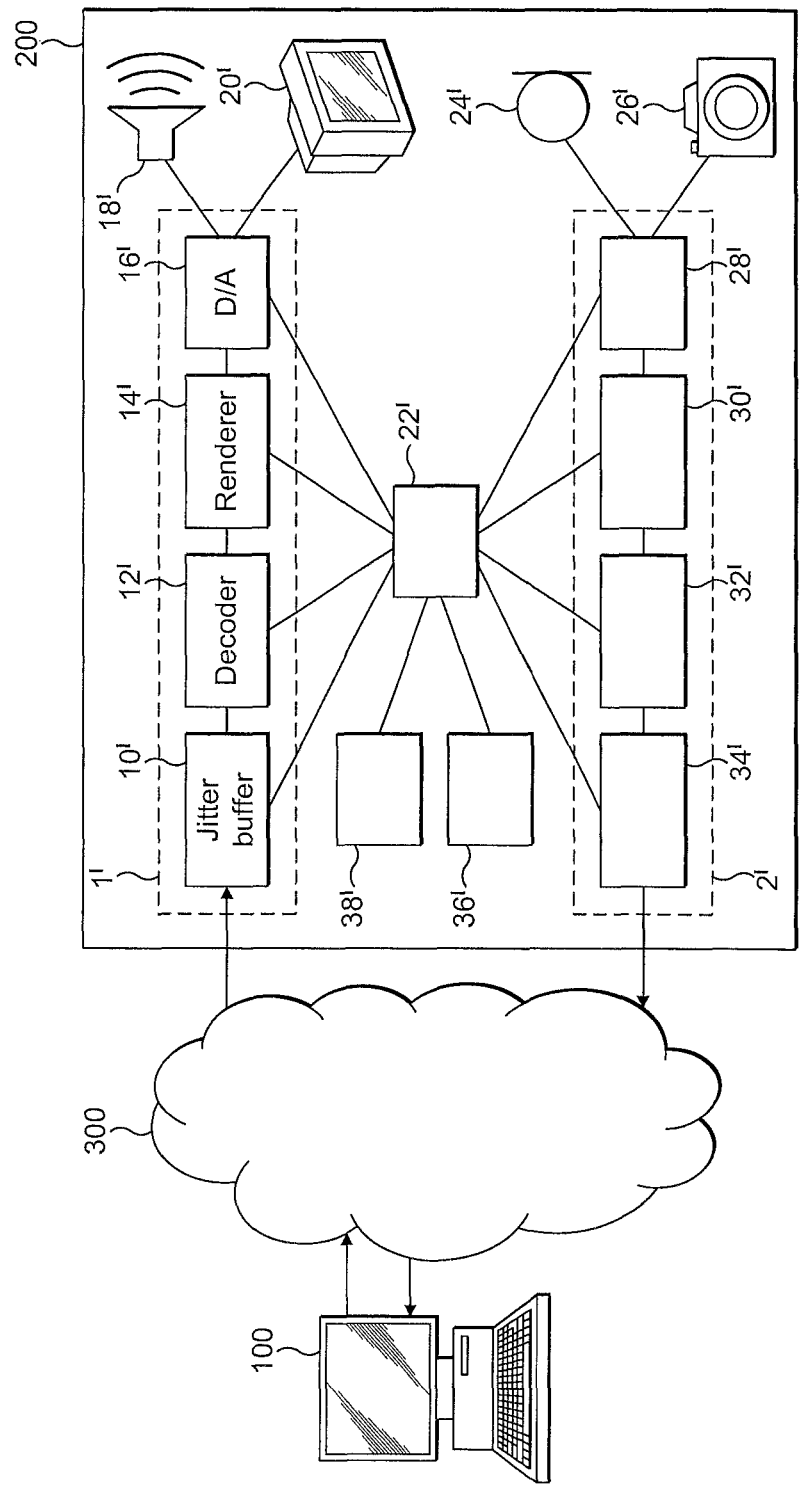
FIG. 3 shows a schematic block diagram of another user terminal suitable for the implementation of an embodiment of the present invention.

Reference will now be made to FIG. 3, which shows the second terminal 200 in more detail.

In this embodiment the second terminal 200 takes a similar format to the first terminal 100. Therefore, like components are indicated with the same reference numerals, except that a prime "'" suffix is appended to the reference numerals in FIG. 3, to help distinguish discussion of features of the second terminal 200 from discussion of features of the first terminal 100. In the interests of conciseness, no further detailed description of the features of the second terminal 200 will be provided. Of course, in embodiments where the end-point 200 comprises an apparatus other than a user terminal, one or more of the illustrated microphone 24', webcam 26', loudspeaker 18', and display screen 20' may be omitted.

If a large amount of data is passing through the network 300 between various terminals, routers and other nodes, then network congestion arises and the terminals 100, 200 may experience long delays in packet delivery. Packets may even be lost or dropped on the connection between the terminals 100, 200. For example, as discussed above, a drop-tail buffer at a router within the network 300 can reach its maximum permitted size, after which packets newly-received at the router from the first terminal 100 are dropped. This can result in the second terminal 200 receiving incomplete data, and can also subsequently result in additional traffic passing through the network 300, due to retransmission of packets that were lost or dropped en route to their intended recipients.

In order to try to reduce congestion in the network 300, embodiments of the present invention provide a method for controlling a rate of transmission of packets from the transmitting terminal into the network 300 towards the receiving terminal. Some embodiments of the present invention provide an indication of congestion to the transmitting terminal 100 from the receiving terminal 200, such that the transmitting terminal can reduce its packet sending rate in an attempt to reduce the number of packets which are dropped on the connection between the terminals 100, 200.

Figure 4:
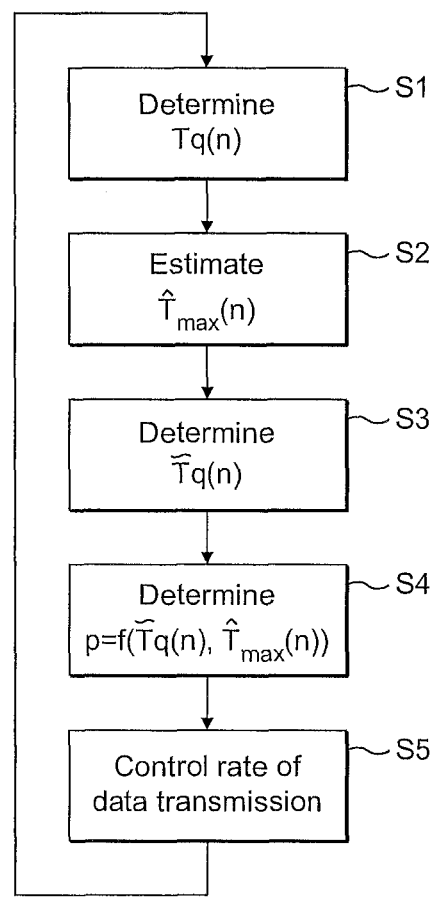
FIG. 4 shows a flow chart illustrating a method according to an embodiment of the present invention.

Reference will now be made to FIG. 4, which illustrates an example of the method of the present invention. The example method comprises determining at the processor 22' of the second terminal 200 a value indicative of a one-way end-to-end transmission delay "Tq" of a packet "n" on the path between the end-points 100, 200, in other words a value indicative of the time that the packet "n" spends in queue(s) when traveling from the first terminal 100 to the second terminal 200. This value will be referred to as "Tq(n)", and this step is step S1 in FIG. 4.

To determine this value, the packet sent from the first terminal 100 to the second terminal 200 is time-stamped on transmission, such as to provide in the packet an indication of the time (Tx(n)) at which the packet was transmitted from the first terminal 100. Alternatively, the indication can be comprised in side information piggybacked to the packet. The time (Tr(n)) of receipt of the packet at the second terminal 200 is noted. However, the indication provided in the packet is dependent on the value of a first clock at the first terminal 100, whereas the recorded time of receipt is dependent on the value of a second clock at the second terminal 200. Due to lack of synchronization between the two clocks ("clock offset"), the second terminal 200 does not have an indication of the time at which the packet was sent from the first terminal according to the second clock. This clock offset can be estimated and eliminated over time. Suitable methods for doing this are set out in US2008/0232521 and co-pending U.S. patent application Ser. No. 12/455,908. The contents of both of these document in relation to this operation are incorporated herein by reference.

The methods set out in those documents also filter out (from the result of the sum: Tr(n)−Tx(n)) a propagation delay that the packet experiences by traveling the physical distance between the two terminals 100, 200 at a certain speed (the speed of light, when propagation over fibre optics is employed). A summary of the method described in U.S. patent application Ser. No. 12/455,908 is as follows.

The raw packet delay is the difference between the receiver clock reading and the packet timestamp, i.e.:

$$D(n)=Tr(n)-Tx(n)$$

Of course, D(n) is not an accurate measurement of the actual transmission delay, because Tr(n) and Tx(n) are measured with respect to different, non-synchronized clocks. D(n) can be described by:

$$D(n)=Tq(n)+Tp(n)+Tc(n)$$

where Tq(n) is the packet queuing delay, Tp(n) is the propagation delay and Tc(n) is the measurement error due to clocks not being synchronized. The assumption is made herein that although Tc(n) and Tp(n) are unknown, they are close to constant over time, and we shall refer to their sum as Tpc(n)=Tp(n)+Tc(n).

A minimum tracking function observes the one way delays D(n) to generate an estimated compensation for the clock- and propagation offset Tpc(n). In one embodiment, the minimum tracking function is implemented as a Kalman filter which models Tpc(n) as a first order model to grasp any clock drift. Minimum tracking is obtained by employing higher observation noise in the Kalman filter for higher values of D(n). The estimated offset Tpc(n) is subtracted from D(n) to obtain the estimate of Tq(n).

Thus, using the indication of (Tx(n)) and the recorded time (Tr(n)) of receipt and the method set out in co-pending U.S. patent application Ser. No. 12/455,908 or in US2008/0232521, both the clock mismatch and the propagation delay can be estimated and filtered out over time to obtain an estimate of the one-way queuing delay "Tq(n)". In alternative embodiments, alternative methods may be used to obtain an estimate of "Tq(n)".

In preferred embodiments, the one-way queuing delay is estimated for every packet received at the second terminal 200, i.e. "n", "n+1", "n+2", etc. In alternative embodiments, this delay may be estimated only for every 2nd or 3rd packet received at the second terminal 200. So, the estimation may be carried out every X received packet(s), where X is an integer. In alternative embodiments, the estimation may be carried out once per Y seconds, for example where Y=1.

Preferably the processor 22' of the terminal 200 calculates "Tq(n)". However, in alternative embodiments, the calculation may be performed elsewhere (such as at a different processor of the terminal 200 or at an entity distinct from but connected to the terminal 200), and the processor 22' of the user terminal 200 may then receive the calculated value for "Tq(n)".

The method further comprises estimating, at the processor 22' of the terminal 200, a value indicative of a maximum end-to-end transmission delay "T̂max" on the network path between the end-points 100, 200, in other words a value indicative of the maximum time that a packet may spend in queue(s) when traveling from the first terminal 100 to the second terminal 200 (step S2 in FIG. 4). Thus, T̂max may provide an estimate of a maximum possible queue length at a buffer of a router located on the network path between the first and second terminals 100, 200. This estimate of the maximum end-to-end transmission delay "T̂max" is periodically updated using values indicative of the one-way end-to-end transmission delay "Tq" for certain packets, as will be described in more detail below.

To estimate "T̂max(n)", (i.e. "T̂max" following receipt of packet "n" at the second terminal 200) first the determined "Tq(n)" is compared to a previous estimate of the maximum end-to-end transmission delay "T̂max(n−1)" (that was estimated following receipt of packet "n−1"). (Note that an initial estimate of the maximum end-to-end transmission delay, that is used when there is no "previous" estimate, is preferably a default value, such as 250 ms).

If the value indicative of the end-to-end transmission delay "Tq(n)" for packet "n" is greater than or equal to a value indicative of the previous estimate of the maximum end-to-end transmission delay "T̂max(n−1)", then a relatively small weighting "(wT)", such as 0.9, is applied to the value representative of the previous estimate of the maximum end-to-end transmission delay "T̂max(n−1)". On the other hand, if the value indicative of the end-to-end transmission delay "Tq(n)" is less than the value indicative of the previous estimate of the maximum end-to-end transmission delay "T̂max(n−1)", then a relatively large weighting "(wT)", such as 0.99, is applied to the value representative of the previous estimate of the maximum end-to-end transmission delay "T̂max(n−1)". Once the weighting factor "(wT)" has been determined on the basis of this comparison, a second weighting factor "(1−wT) is applied to the value representative of the end-to-end transmission delay "Tq(n)". It can be seen that the second weighting factor in this embodiment is equal to the difference between the weighting factor "(wT)" and "1".

As such, large values of the observed end-to-end queuing delay "Tq(n)" are weighted higher than small values of the observed end-to-end queuing delay "Tq(n)". Thus, if the observed end-to-end queuing delay for a particular packet is greater or equal to the previous estimate of the maximum end-to-end transmission delay, the observed end-to-end queuing delay for that packet has a greater impact on the revised estimate of the maximum end-to-end transmission delay than if the observed end-to-end queuing delay for that packet was smaller than the previous estimate of the maximum end-to-end transmission delay.

The revised estimate of the maximum end-to-end transmission delay between the terminal 100 and terminal 200 following receipt of packet (n) is then obtained using the following filter:

$$\hat{T}_{max}(n) = w_T \hat{T}_{max}(n-1) + (1-w_T) T_q(n)$$

if $T_q(n) \geq \hat{T}_{max}(n-1)$, $w_T = 0.9$;
else $w_T = 0.99$;
where $T_q(n)$ is the queueing delay In other words, a weighted value indicative of the previous estimate of the maximum end-to-end transmission delay is summed with a weighted value indicative of the observed end-to-end transmission delay to obtain an updated estimate of the maximum end-to-end transmission delay between the terminal 100 and the terminal 200.

In alternative embodiments, the estimate of the maximum end-to-end transmission delay "T̂max(n)" is obtained through a different method. For example, the maximum end-to-end transmission delay "T̂max(n)" may be estimated to be equal to a particular observed end-to-end transmission delay, such as a maximum observed end-to-end transmission delay. This maximum observed end-to-end transmission delay is preferably a maximum recorded value indicative of the end-to-end transmission delay that has been obtained in a predetermined number of previous measurements of the one-way end-to-end queuing delay. For example, the maximum end-to-end transmission delay "T̂max(n)" may be estimated to be equal to the maximum one-way end-to-end queuing delay Tq that was observed over the previous 100 iterations of the method, i.e. the maximum value of Tq(n−99) to Tq(n).

Preferably the estimation of the maximum end-to-end transmission delay on the path between the end-points 100, 200 "T̂max(n)" is carried out by the processor 22' of the terminal 200. However, in alternative embodiments, the estimate may be made elsewhere (such as at a different processor of the terminal 200 or at an entity distinct from but connected to the terminal 200), and the processor 22' of the user terminal 200 may then receive the estimate.

A subsequent step (step S3 in FIG. 4) in the method is to determine an average end-to-end transmission delay $\tilde{T}_q(n)$ "on the network path between the end-points 100, 200. Thus, $\tilde{T}_q(n)$" may provide an estimate of a current or instantaneous queue length at the buffer of the router located on the network path between the first and second terminals 100, 200.

In some embodiments, this determination comprises updating a previous determined average end-to-end transmission delay on the path. In this embodiment, the average transmission delay is obtained using a weighted average. Thus, the average end-to-end transmission delay on the path is determined using the following equation:

$$\tilde{T}_q(n) = w \tilde{T}_q(n-1) + (1w) T_q(n)$$

in which "$\tilde{T}_q(n)$" is the determined average end-to-end transmission delay on the path determined following receipt of packet "n" at the second terminal 200, "$\tilde{T}_q(n-1)$" is a previously-determined average end-to-end transmission delay (that was determined following receipt of packet "n−1"), "$\tilde{T}_q(n)$" is the current observed one-way end-to-end queuing delay on the path, and "w" is the weighting factor. It can be seen that the weighting factor applied to the value representative of the observed one-way end-to-end transmission delay in this embodiment is equal to the difference between the weighting factor applied to the value representative of the previous determined end-to-end transmission delay and "1". Preferably the weighting factor "w" is unaltered for each iteration of the described method, and may be equal to, say, 0.99. In some embodiments, the weighting factor "w" is zero.

In other words, determining the average end-to-end transmission delay of the path between the end-points 100, 200 involves summing a weighted value indicative of a previous determined average end-to-end transmission delay on the path and a weighted value indicative of the current observed end-to-end transmission delay on the path.

In alternative embodiments, the determination of the average end-to-end transmission delay "$\tilde{T}_q(n)$" is obtained through a different method. For example, "$\tilde{T}_q(n)$" may be considered to be the average of values of Tq obtained in a predetermined number of previous measurements of Tq. For example, the average end-to-end transmission delay "$\tilde{T}_q(n)$" may be estimated to be the average of Tq(n−99) to Tq(n).

Preferably the determining of "$\tilde{T}_q(n)$" is carried out at the processor 22' of the terminal 200. However, in alternative embodiments, the determining may be made elsewhere (such as at a different processor of the terminal 200 or at an entity distinct from but connected to the terminal 200) and the processor 22' of the terminal 200 may then receive the determined "$\tilde{T}_q(n)$".

The next step of the example method is to calculate a probability as to whether a packet should be marked with an indication of congestion on the network path (as discussed in more detail below) (step S4 in FIG. 4). The probability is effectively a measure of congestion that relates to how close a buffer at the router on the network path is to overflow. The probability may be a probability that the queue is beyond a predetermined proportion of the maximum possible queue length.

In this embodiment, this calculation involves an algorithm that uses the maximum end-to-end transmission delay "T̂max (n)" on the network path and the average end-to-end transmission delay on the network path "$\tilde{T}_q(n)$".

The algorithm may be similar to the RED algorithm that is performed at a router. A router running RED calculates the average queue size, using a low-pass filter with an exponential weighted moving average, and the average queue size is compared to two thresholds, a minimum threshold and a maximum threshold. When the average queue size is less than the minimum threshold, no packets are marked. When the average queue size is greater than the maximum threshold, every arriving packet is marked. The RED algorithm can be summarized by the following pseudo code:

Set the minimum and maximum threshold to be a fraction of the total buffer size, and set the parameter $max_p$ by default:

$$max_p = 0.1; min_{th} = B_{max}/6; max_{th} = 3 * min_{th}$$

The default of RED is set maxp to 0.1. Then, for each packet arrival, calculate the average queue size avg:
if $min_{th} \leq avg < max_{th}$
then the marking probability $p = max_p (avg - min_{th})/(max_{th} - min_{th})$ and the arriving packet is marked according to the probability p:
else if $avg \geq max_{th}$
then the arriving packet is marked (marking probability equals 1).

An example algorithm that may be used at an end-point in the present invention may be based on this RED algorithm (or its variants) with the buffer size limit $B_{max}$ replaced by the estimation of the maximum queuing delay Tmax(n), and the estimation of the average queue size "avg" replaced by the estimation of the average queuing delay $\tilde{T}_q(n)$. The rest of the pseudo code may otherwise be the same.

Thus, in this embodiment, the algorithm employed can be considered a "virtual AQM" algorithm involving a minimum threshold "minth" and a maximum threshold "maxth". These thresholds may be set as a function (e.g. a fraction) of "$\hat{T}$max (n)" and the algorithm may be as follows:

$$\text{maxp} = 0.1; \text{minth} = \hat{T}_{max(n)} / 6; \text{maxth} = 3^* \text{minth}$$
$$\text{if } \tilde{T}_q(n) < \text{minth}$$
$$\text{then } p = 0$$
$$\text{else if minth} \leq \tilde{T}_q(n) < \text{maxth}$$
$$\text{then } p = \text{max}_p (\tilde{T}_q(n) - \text{min}_{th})/\text{max}_{th} - \text{min}_{th})$$
$$\text{else if } \tilde{T}_q(n) \geq \text{max}_{th}$$
$$\text{then } p = 1$$

So, if the average end-to-end transmission delay on the network path is a value less than the minimum threshold, p equals zero. If the average end-to-end transmission delay on the network path is a value greater than or equal to the maximum threshold, p equals one. If the average end-to-end transmission delay on the network path is a value greater than or equal to the minimum threshold, but less than the maximum threshold, p is a value between zero and 0.1. How the determined value of "p" is used is discussed in more detail below.

This algorithm may be repeated for each packet. For example, where step S4 is carried out at the second terminal 200, this algorithm may be carried out for each packet that arrives at the second terminal 200 from the first terminal 100.

Of course, in other embodiments a different algorithm may be used to determine "p", although preferably the algorithm uses $\hat{T}$max(n) and $\tilde{T}_q(n)$. For example, other queue-length-based AQM could be implemented virtually at an end-point, since these AQM algorithms are all based on the average queue size and buffer size limit, although different functions are used to calculate the marking probability p. For example, in RED gentle the value of "p" can increase linearly from maxp to 1 as $\tilde{T}_q(n)$ increases from maxth to $\hat{T}$max(n). Further, in adaptive RED the value of maxp may be set adaptively, e.g. from 0.01 to 0.5, according to a traffic load reflected by the dynamics of $T_g(n)$ In alternative embodiments, $\tilde{T}_q(n)$ could be replaced by the instantaneous Tq(n) in the algorithm used in step S4. In that case, the instantaneous Tq(n) provides an estimate of a current or instantaneous queue length at the buffer of the router located on the network path between the first and second terminals 100, 200.

This calculation at step S4 may be made at the processor 22' of the terminal 200 or it may be made elsewhere (such as at a different processor of the terminal 200 or at an entity distinct from but connected to the terminal 200) and the processor 22' receives the result of the calculation.

In this embodiment, the probability "p" is a probability that packet "n" is to be marked with an indication of congestion (preferably by setting an ECN-flag in the IP header of the packet "n") following its receipt at the terminal 200. Thus, according to some embodiments of the invention, a packet is marked with an indication of congestion based on a statistical probability. Preferably the indication of congestion comprises at least one bit (e.g. one bit or two bits).

The indication of congestion set in the packet causes a feedback instruction to be sent to the first terminal 100 from the second terminal 200 to make the first terminal 100 reduce its data-sending rate. For example, when the TCP protocol is utilized, acknowledgement packets are marked and fed back to the first terminal 100.

Alternatively, in embodiments where the second terminal 200 is not enabled to provide such marking, or where the first terminal 100 is not enabled to react to such marking, the calculated probability p may be used to determine a bit rate for the first terminal 100 to use when sending data on the path. The value of p may be supplied to the first terminal 100 from the second terminal 200 as an instruction via custom "in-band" feedback. For example, the value of "p" may be explicitly fed back to the first end-point 100 through a proprietary protocol or a datagram in the application layer. The datagram may include a field set so as to indicate the probability p. The bit rate to be used by the first end-point 100 may then be determined at the processor 22 by entering the received value of p into an equation, or a look-up table comprising mappings between values of the probability p and bit rate adaptation steps may be consulted by the processor 22 to select a new bit rate. Alternatively, the new bit rate to be used by the first terminal 100 may be determined at the second terminal 200 on the basis of the value of "p", and an indication of the determined bit rate may then be supplied via similar custom "in-band" feedback to the first terminal 100 from the second terminal 200 as an instruction to the first terminal 100 to apply the determined bit rate. The new bit rate may be determined at the second terminal 200 by the processor 22' consulting a look-up table comprising mappings between values of the probability p and bit rate adaptation steps (or specific bit rates to achieve) to select a new bit rate.

In any case, on the basis of the feedback received from the second terminal 200, the processor 22 of the first terminal 100 is preferably arranged to control the transmission rate of data from the terminal 100 onto the network path on which the connection between the end-points 100, 200 is established (step S5 in FIG. 4).

For example, a data transmission rate may be achieved by the processor 22 at the first terminal 100 controlling a bit rate at which the encoder 30 encodes data for transmission, on the basis of the feedback received from the second terminal 200. The encoder 30 groups bits of a stream of digital information into frames representing portions of a signal to be encoded. The frames are then encoded according to an encoding scheme implemented in the encoder 30. The processor 22 may control the bit rate at which the encoder 30 encodes data on the basis of the feedback, for example by editing or altering the encoding scheme used by the encoder 30 or by instructing the encoder 30 to use a different encoding scheme. The processor 22 may cause the different encoding scheme to be provided to the encoder 30. Different available encoding schemes may be stored in memory accessible by the processor 22 and/or by the encoder 30.

Additionally or alternatively, the transmitting circuitry 2 may comprise a post encoding block between the packetizer 32 and the buffer 34, and which receives the output of the packetizer 32. The processor 22 may control the post encoding block to drop a greater, or fewer, number of packets before placing them in the buffer 34 for transmission into the network 300, on the basis of the feedback received from the second terminal 200. Thus, the data transmission rate may be controlled by controlling an input of packets input into the buffer 34.

Following an iteration of the above method (i.e. steps S1 to S4) at the second terminal 200, the process then returns to step S1 to repeat the above steps for a subsequently-received packet (e.g. packet n+1), and to thus obtain an updated value of p for packet "n+1" received at the second terminal 200.

In some embodiments, the second end-point 200 sets a flag in a packet to be sent from the second-end-point 200 to the first end-point 100. The flag may be identified by the first end-point 100.

Thus, the first end-point 100 is provided with an indication of congestion level by way of feedback from the second end-point 200, either in the form of a received flag or a received instruction, regardless as to whether any routers on the network path between the end-points 100, 200 implement AQM or support ECN. The first end-point 100 can then react suitably to this indication, such as by reducing its rate of transmission of packets into the network 300, delaying the transmission of packets into the network 300 until it is determined that the network congestion has reduced, or by dropping some packets rather than transmitting them into the network 300.

A data sending rate at the first terminal 100 may be determined according to the following equation:

$$R(n)=R(n-1)+K\{N_T-R(n-1)T_{fq}\}$$

in which R(n) is the rate, Tfq is a queuing delay in a forward path, K is a step size, and NT is an adaptive buffer set-point, i.e. a target number of packets to queue in a buffer. NT is dependent on the marking probability "p", as shown in the following equation:

$$N_T = \frac{\alpha}{\Lambda(.)}$$

in which α is a constant. $\Lambda(.)=\Lambda(p)$, and is a normalizing function of the marking probability p. One example of the normalizing function is:

$$\Lambda(p) = \begin{cases} \frac{2*p}{1-2*p}, & \text{if } p < 0.5; \\ \infty, & \text{if } p \geq 0.5; \end{cases}$$

The above example of the normalizing function is tuned to work with RED gentle version, in which the value of "p" can increase linearly from maxp to 1 as $\hat{T}_q(n)$ increases from maxth to $\hat{T}max(n)$. The normalizing function can be redefined to work with other AQM algorithm.

In accordance with embodiments of the present invention, the marking probability p is determined at the second end-point 200 of a connection. As a result of calculated p, the second end-point 200 may provide a mark in a received packet, causing the TCP receiver to send an acknowledgement packet to the data source, i.e. the first end-point 100, with an echo flag (e.g. an ECN-echo flag) set in the TCP header. The TCP source, i.e. the first end-point 100, can then estimate the marking probability p by counting the number of echo flags it receives.

Alternatively, p can be used to determine a new transmission rate using the above equations. First the normalizing function Λ(n) is found from p. From the normalizing function a target queue set point NT=α/Λ(n) is found, and from NT, the requested transmission rate is updated according to R(n)=R(n−1)+K(NT−R(n−1) Tfq). α and K can be constants. These operations may be carried out at the transmitter 100, and R(n) is used as the new target sending rate for sending data from the transmitter 100 onto the network path. Alternatively, the operation can be carried out at the receiver 200 and an indication of the result (R(n)) fed back to the transmitter 100 from the receiver 200. The transmitter 100 can then send data onto the network path according to the indicated value of R(n) received from the receiver 200.

Thus, the marking probability p can be used to determine the target number of packets to queue at the data source, and ultimately the data transmission rate from the data source. This approach allows the data source to scale its rate dynamically according to network conditions, through the use of a time-variant buffer set-point. The operation of the data source may be in accordance with the operation discussed in "Normalized Queueing Delay: Congestion Control Jointly Utilizing Delay and Marking", mentioned above.

In some embodiments any one or more of steps S1 to S4 of the method may be performed at the first end-point 100. For example, the first end-point may record the time (Tx(n)) at which it transmits a packet "n" to the second end point 200. The second end-point 200 may then report the time of receipt (Tr(n)) of the packet at the second end-point 200 to the first end-point 100. The processor 22 may then use these values, (and preferably but not necessarily) the method set out in U.S. patent application Ser. No. 12/455,908 or US2008/0232521, to estimate and filter out both the clock mismatch and the propagation delay of the packet to obtain an estimate of the one-way queuing delay "Tq(n)". The processor 22 may then use this value "Tq(n)" to perform any or all of steps S2 to S4, in a manner similar to that described above.

In the above-described embodiments step S5 is performed at the first end-point 100. In some embodiments, the rate of transmission of data from the second end-point 200 may be controlled on the basis of the probability determined at step S4. For example, the second end-point 200 may mark a packet that it has received, which marking causes the processor 22' to control the transmission rate of data from the second terminal 200 onto the network path.

In preferred embodiments of the invention, the marking probability p is used at one of the end-points 100, 200 to set the flags in packets only if it is detected that routers in the network 300 on the path between the end-points 100, 200 are incapable of setting ECN-flags. One-way to detect that the routers do not support ECN-flag setting is to assume that the routers do not support ECN-flag setting, and then reject the assumption if ECN-flags are detected in packets received at the end-point 100, 200.

In scenarios in which it is detected that one or more routers on the path do support ECN-flag marking, then the terminal 100, 200 may be configured to stop the setting of flags in subsequent packets or to stop sending instructions or flags to the other end-point to cause the other end-point to alter its data transmission rate.

Alternatively, flag-setting at an end-point 100, 200 and ECN-flag setting at one or more routers on the network path can work in tandem. For example, the processor of one of the end-points 100, 200 may be arranged to cause flags to be set in received packets or packets to be sent to the other end-point 200, 100, to indicate congestion, either dependent upon the value of "p" determined at the end-point 100, 200 itself, or on the basis of ECN-flags detected in packets received at the end-point 100, 200. A flag may be set in a packet received at an end-point, to indicate congestion, if it is determined that a router on the network path is capable of providing such flags in packets to indicate congestion on the network path, but that no such indication of congestion is included in the packet received at the end-point.

In any case, a rate controller at an end-point (such as a terminal or other node) of a connection can benefit from the flag-setting performed at another end point or feedback provided by the another end-point. Since the end-point is provided with an indication of congestion level by way of feedback from the other end-point, either in the form of a received flag or a received instruction, regardless as to whether any routers on the network path between it and the other end-point implement AQM or support ECN, the end-point can react suitably. By reactively controlling a rate of transmission of packets into the network from the end-point, the quality of the call or other communication event between the end-points is less likely to be adversely affected by the congestion.

In preferred embodiments, the processes discussed above are implemented by software stored on a general purpose memory such as flash memory or hard drive and executed on a general purpose processor, the software preferably but not necessarily being integrated as part of a communications client. However, alternatively the processes could be implemented as separate application(s), or in firmware, or even in dedicated hardware.

Any or all of the steps of the method discussed above may be encoded on a computer-readable medium, such as memory, to provide a computer program product that is arranged so as, when executed on a processor (such as processor 22' or processor 22), to implement the method.

While this invention has been particularly shown and described with reference to preferred embodiments, it would be understood for those skilled in the art that various changes in form and detail may be made without departing from the scope of the invention as defined by the claims.

What is claimed is:

1. A method of controlling traffic transmitted over a network path from a transmitter to a receiver via a router, the traffic comprising a plurality of packets, and the method comprising:
   at the receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and
   based on said estimates of current queue length and maximum queue length, controlling traffic between the transmitter and receiver over said network path including sending, by the receiver an indication of a designated rate of transmission of traffic to be employed by the transmitter to cause the transmitter to use the designated rate of transmission when sending traffic to the receiver.

2. The method of claim 1, comprising determining a measure of congestion based on the estimate of the current queue length and the estimate of maximum queue length, wherein said control is based on the measure of congestion.

3. The method of claim 2, wherein the measure of congestion relates to how close the buffer is to overflow.

4. The method of claim 2, wherein the measure of congestion comprises a measure of a probability that the queue is beyond a predetermined proportion of the maximum queue length.

5. The method of claim 2, wherein the measure of congestion is determined at the receiver.

6. The method of claim 5, wherein the measure of congestion is determined at the receiver and fed back to the transmitter.

7. The method of claim 5, comprising providing an indication of congestion in a packet fed back from the receiver to the transmitter, in dependence on the measure of congestion.

8. The method of claim 5, comprising providing, at the receiver, an indication of congestion in a packet received at the receiver, in dependence on the measure of congestion.

9. The method of claim 8, wherein the indication of congestion is provided in the packet if it is determined that the router is capable of providing an indication of congestion on the network path, and that no such indication of congestion is included in the packet received at the receiver.

10. The method of claim 1, wherein the estimate of current queue length is based on an average observed delay for packets to travel from the transmitter to the receiver.

11. The method of claim 1, wherein the maximum observed delay and the observed delay are observed at the receiver and fed back to the transmitter, said estimates of current queue length and maximum queue length being estimated at the transmitter based on the delays fed back from the receiver.

12. The method of claim 11, comprising providing an indication of congestion in a packet transmitted from the transmitter to the receiver, in dependence on the measure of congestion.

13. The method of claim 12, wherein the indication of congestion comprises an explicit congestion notification flag.

14. The method of claim 12, wherein the indication of congestion is provided on the basis of a determination that the router is incapable of providing an indication of congestion on the network path.

15. The method of claim 1, comprising determining a rate of transmission of traffic to be employed by the transmitter when sending traffic over the network path to the receiver, in dependence on the estimates of current queue length and maximum queue length, wherein said controlling is based on the determined rate of transmission.

16. The method of claim 15, wherein the rate of transmission is determined at the receiver and fed back to the transmitter.

17. The method of claim 15, wherein the maximum observed delay and the observed delay are observed at the receiver and fed back to the transmitter to cause the transmitter to generate said estimates of current queue length and maximum queue length based on the maximum observed delay and the observed delay fed back from the receiver, and compute the designated rate of transmission based on the indication sent by the receiver.

18. The method of claim 1, wherein one or both of the transmitter and receiver comprises a user terminal.

19. The method of claim 1, wherein the network path comprises a path over the internet, and
   wherein the receiver is an apparatus that comprises a processor configured to execute one or both of a voice over internet protocol client and a video over internet protocol client, and that is configured to participate in a call with the transmitter via the network path.

20. A method of controlling traffic transmitted over a network path between a transmitter and a receiver via a router, the traffic comprising a plurality of packets, and the method comprising:
   at one of said transmitter and receiver, estimating a maximum queue length at a buffer of the router based on a maximum observed delay for traffic to travel from the transmitter to the receiver, and estimating a current queue length at the buffer of the router based on an observed delay for one or more specified packets to travel from the transmitter to the receiver; and
   based on said estimates of current queue length and maximum queue length, sending feedback from said one of said transmitter and receiver to the other of said transmitter and receiver, which feedback is for causing said other of said transmitter and receiver to control traffic over the network path the feedback including an indication of a rate of transmission of traffic to be employed by the other of said transmitter and receiver when sending traffic over the network path.

21. The method of claim 20, wherein the estimate of current queue length is based on an average observed delay for packets to travel from the transmitter to the receiver.

22. The method of claim 20, comprising providing, at said one of said transmitter and receiver, an indication of congestion in a packet received at said one of said transmitter and receiver, wherein the feedback is sent in dependence on a detection of the indication of congestion in the packet received.

23. The method of claim 20, wherein the feedback comprises a packet comprising an explicit congestion notification flag.

24. The method of claim 20, comprising determining a measure of congestion based on the estimate of the current queue length and the estimate of maximum queue length.

25. The method of claim 24, comprising sending the feedback in dependence on the measure of congestion.

26. The method of claim 24, wherein the measure of congestion relates to how close the buffer is to overflow.

27. The method of claim 24, wherein the measure of congestion comprises a measure of a probability that the queue is beyond a predetermined proportion of the maximum queue length.

28. The method of claim 24, wherein the feedback comprises an indication of the measure of congestion.

29. A computer program product comprising computer memory encoded with codes that when executed on a processor performs the steps of claim 1.

30. A computer program product comprising computer memory encoded with codes that when executed on a processor performs the steps of claim 20.

31. A transmitter comprising:
an estimator configured to estimate a maximum queue length at a buffer of a router on a network path between the transmitter and a receiver based on a maximum observed delay for traffic to travel from the transmitter to the receiver;
an estimator configured to estimate a current queue length at the buffer of the router based on an observed delay for one or more specified packets to travel from the transmitter to the receiver; and
a controller configured to control traffic between the transmitter and receiver over said network path, based on said estimates of current queue length and maximum queue length and feedback received from the receiver that is indicative of a rate of transmission of traffic to be employed by the transmitter when sending traffic over the network path.

32. A receiver comprising:
an estimator configured to estimate a maximum queue length at a buffer of a router on a network path between a transmitter and the receiver based on a maximum observed delay for traffic to travel from the transmitter to the receiver;
an estimator configured to estimate a current queue length at the buffer of the router based on an observed delay for one or more specified packets to travel from the transmitter to the receiver; and
a controller configured to control traffic between the transmitter and receiver over said network path, based on said estimates of current queue length and maximum queue length, and feedback received from the transmitter that is indicative of a rate of transmission of traffic to be employed by the receiver when sending traffic over the network path.

33. A transmitter comprising:
an estimator configured to estimate a maximum queue length at a buffer of a router on a network path between the transmitter and a receiver based on a maximum observed delay for traffic to travel from the transmitter to the receiver;
an estimator configured to estimate a current queue length at the buffer of the router based on an observed delay for one or more specified packets to travel from the transmitter to the receiver; and
a sender configured to send feedback to said receiver, based on said estimates of current queue length and maximum queue length, which feedback includes data indicative of a rate of transmission of traffic to be employed by the receiver for causing said receiver to control traffic over the network path in accordance with the rate of transmission.

34. A receiver comprising:
an estimator configured to estimate a maximum queue length at a buffer of a router on a network path between a transmitter and the receiver based on a maximum observed delay for traffic to travel from the transmitter to the receiver;
an estimator configured to estimate a current queue length at the buffer of the router based on an observed delay for one or more specified packets to travel from the transmitter to the receiver; and
a sender configured to send feedback to said transmitter, based on said estimates of current queue length and maximum queue length, which feedback includes data indicative of a rate of transmission of traffic to be employed by the transmitter for causing said transmitter to control traffic over the network path in accordance with the rate of transmission.

35. A method of controlling communications over a network between a first computing terminal and a second computing terminal, the communications comprising a plurality of packets, and the method comprising:
at the first computing terminal, estimating a maximum queue length for a router employed for the communications based on a maximum observed delay between the first computing terminal and the second computing terminal, and estimating a current queue length for the router based on an observed delay for one or more specified packets to travel between the first computing terminal and the second computing terminal; and
based on said estimates of current queue length and maximum queue length, sending, by the first computing terminal data indicative of a designated rate of transmission of traffic to be employed by the second computing terminal to cause the second computing terminal to implement the designated rate of transmission to control communications sent for receipt by the first computing terminal.

36. A computer program product comprising computer memory encoded with codes that when executed on a processor performs the steps of claim 35.

37. A computing device comprising:
an estimator configured to estimate a maximum queue length associated with a router used to communicate over a network with an other computing device based on a maximum observed delay for communications between said computing devices;
an estimator configured to estimate a current queue length associated with the router based on an observed delay for one or more specified packets communicated between said computing devices; and a sender configured to send feedback to said another computing device, based on said estimates of current queue length and maximum queue length, the feedback comprising data indicative of a designated rate of transmission to be employed by the other computing device to control the communications between the computing device and the other computing device.

38. The computing device as recited in claim 37 further comprising:
   transmitting circuitry to transmit communications to the other computing device; and
   receiving circuitry to receive and process communications sent by the other computing device for output to an output device associated with the computing device.

* * * * *